Sept. 25, 1934.　　　　J. F. LEVENTHAL　　　　1,974,574
LENS FOR IMAGING SPACED OBJECTS IN REGISTER
Filed Dec. 24, 1932　　　2 Sheets-Sheet 1
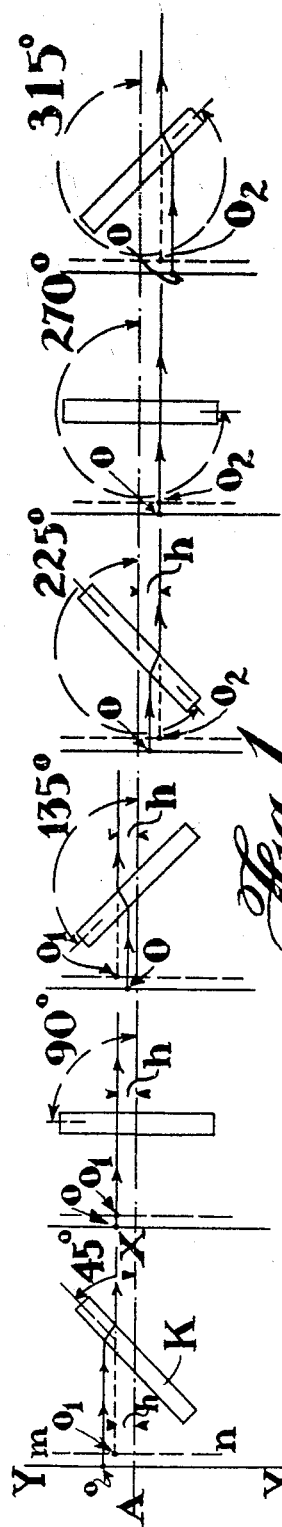
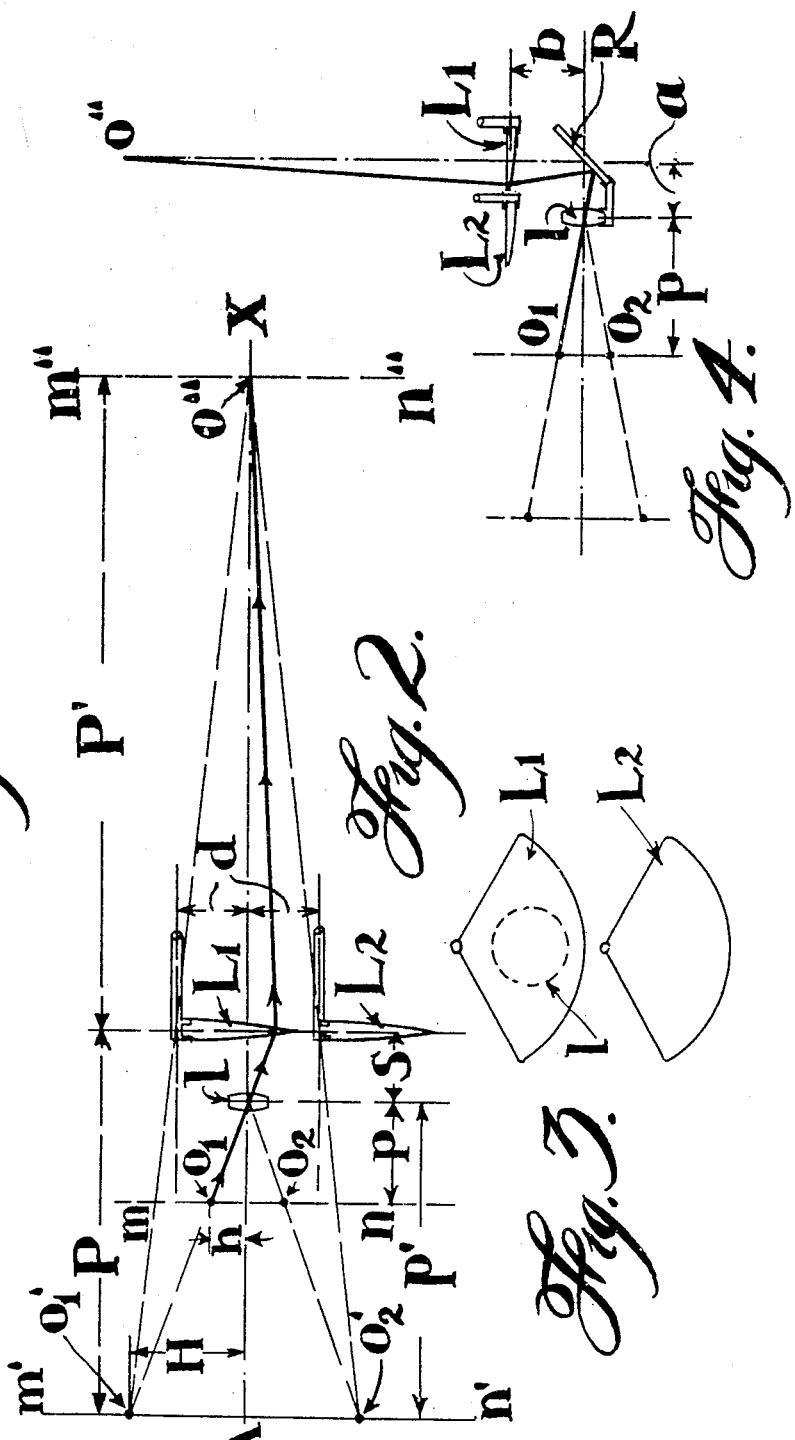
INVENTOR
Jacob Frank Leventhal

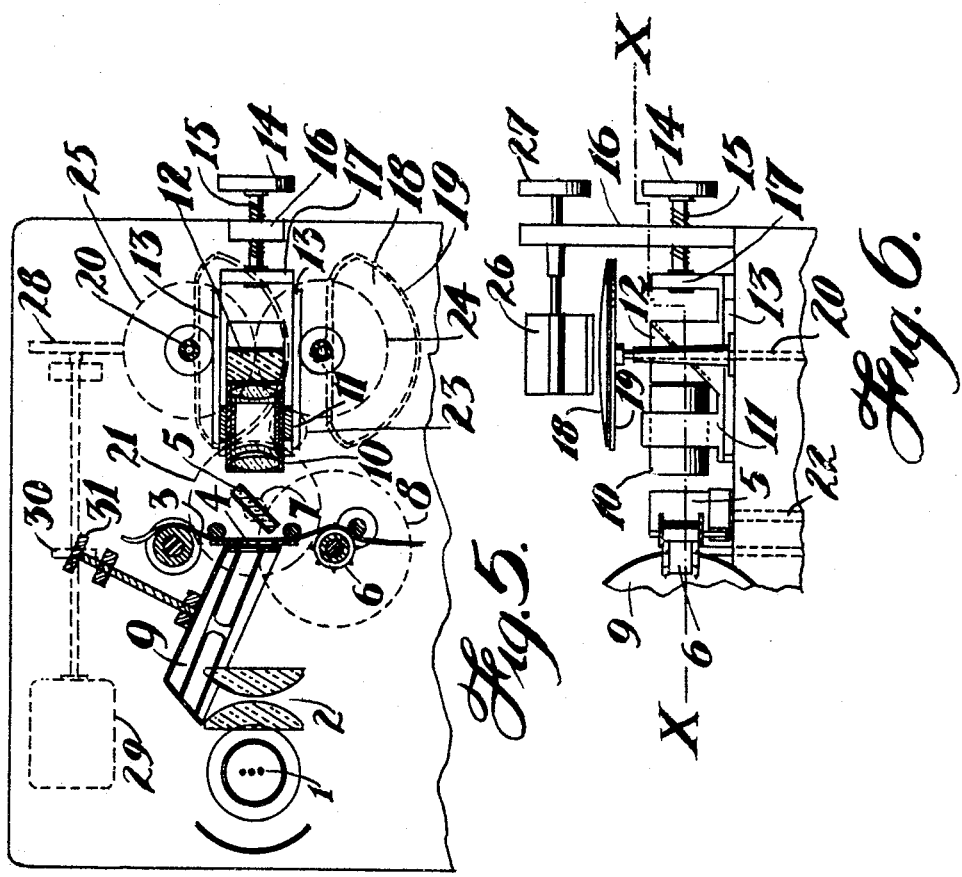

Patented Sept. 25, 1934

1,974,574

UNITED STATES PATENT OFFICE 1,974,574

LENS FOR IMAGING SPACED OBJECTS IN REGISTER

Jacob Frank Leventhal, New York, N. Y.

Application December 24, 1932, Serial No. 648,801

11 Claims. (Cl. 88—16.8)

This invention relates to optics and more especially to a lens system for imaging spaced objects in register.

In a previous application, U. S. Serial No. 456,791, filed June 23, 1931, I show an improvement in optical compensators wherein instead of the usual system which involves one compensation-cycle per picture-cycle and which is productive of a single stationary image of the desired picture centered on the optical axis of the system, I provide two compensation-cycles per picture-cycle and produce consecutively, two stationary images of the desired picture spaced apart, in the direction of film-travel, a distance equal to half the height of a film-picture.

The advantage of this is that since the aberrations of practically all compensators increase with the amount of compensation to be produced, the decreased amount of required compensation (in this case ½) will result in a picture having considerably less aberration.

The spaced images must be brought into registration at the screen-plane and for this purpose I provide two lenses, or, practically speaking portions of lenses the center of each of which lies on a line joining the center of one of the spaced compensated images and the center of the registered screen images. The lenses are alternately covered and uncovered in timed relationship with the production of the spaced images so that the correct lens may be used for each image.

A severe practical limitation resides in the fact that since the diameter of a lens is normally considerably greater than the spacing between the images, only a partial lens may be used during each stage and this results in a material reduction in illumination. An object of the present invention is to make possible the use of a complete lens thereby increasing the illumination in the neighborhood of 100%, under normal conditions. This I accomplish by the use of simple auxiliary lenses of long focus preferably placed in front of a positive lens, and having optical centers spaced in a direction and by an amount determined by the spacing of the object points, there being a lens for each point.

Hitherto it has seemed necessary, in such a system to provide for not only the usual axial motion for focusing but also for motion involving change of spacing of the auxiliary lenses or their equivalent. Such combined motion is difficult to achieve mechanically. Another object of my present invention is to eliminate the necessity for any other than axial motion.

In some constructions, it would be impractical to move the auxiliary lenses since they are arranged as rotating segments alternately rotating into and out of the light beam. In other constructions it would be undesirable to move the object-plane, as for example in non-intermittent motion picture projectors utilizing a rotating mask whose face must lie as nearly as possible near the film or object-plane. A further object of my invention is to make possible the focusing and registering with a motion of only the single positive lens referred to above.

Other objects, novel features and advantages of this invention will be apparent from the following specification and accompanying drawings wherein:

Fig. 1 is a schematic explanation of a principle described in said previous application.

Fig. 2 is a schematic diagram explaining present invention.

Fig. 3 is a schematic elevation amplifying Fig. 2.

Fig. 4 is a modification of Fig. 2.

Figs. 5 and 6 are cross-sectional and elevation views of an embodiment of the invention.

At Fig. 1 is shown schematically a method of compensating the motion of a picture-film in two stages. As the point O traverses the optical axis AX of the system in the film plane Y—Y a distance equal to the height of a film-picture, during the time of one picture-cycle, light emanating from it is acted upon by the rotating plane parallel refractor K in such a way as to give rise to the two stationary virtual images $O_1$ and $O_2$ lying in the virtual image plane $mn$ and apart a distance $2h$. Rotation of the compensator K through the first compensating cycle renders the point O at all times optically conjugate with the point $O_1$. Likewise, rotation of the compensator through the second compensating cycle renders the point O at all times optically conjugate with the point $O_2$.

At Fig. 2 is shown, schematically, the method of focusing the spaced image-points $O_1$ and $O_2$ (which may now be considered object-points) in register at the common point $O''$ in the image plane $m'' n''$. The lens $l$ is placed at such a distance $p$ from the object plane $m n$ as to produce in the virtual image plane $m' n'$ located at a distance $p'$ from $l$, the successive virtual images $O'_1$ of $O_1$ and $O'_2$ of $O_2$, displaced by the magnified amounts H from the axis AX. The lens segments $L_1$ and $L_2$ are rotatably mounted on axles whose axes pass through the optical center of the whole lenses of which $L_1$ and $L_2$ are segments. The axes of the lenses coincide with the axes of the axles and as a consequence, no optical change is produced by rotation of these lenses and, as far as their effect as lenses is concerned, they might as readily be stationary. The purpose of the rotation, is to enable $L_1$ to be effective when $O_1$ is to be imaged, and $L_2$ when $O_2$ is to be imaged. An elevation view of these lenses is shown at Fig. 3.

Going back to Fig. 2, the lens segments $L_1$ and $L_2$ are placed a distance $s$ from $l$ and their optical centers lie on lines connecting $O'_1$ with $O''$ and $O'_2$ with $O''$ respectively, and their focal lengths are such that images of $O'_1$ and $O'_2$ are formed at $O''$. In the diagram, $L_1$ is in position to act on $O'_1$. The actual course of a ray of light from $O_1$ is indicated by the line with arrowheads. The focal length of $l$ is $f$ and of $L_1$ and $L_2$ is $F$. The lens segment $L_1$ cooperates with the main lens $l$ to render the point $O_1$ optically conjugate with the point $O''$ while the lens segment $L_2$ cooperates with the main lens $l$ to render the point $O_2$ optically conjugate with the point $O''$.

The distance $H$ is the magnification of the distance $h$ produced by lens $l$. Since the magnification, according to the fundamental laws of lenses, is $$\frac{p'}{p},$$

$$H = \frac{p'h}{p}.$$

Also, according to these laws, $$p' = \frac{pf}{p-f}$$

whence, upon substituting for $p'$, $$H = \frac{pfh}{(p-f)p} = \frac{fh}{p-f}.$$

The distance $$P' = \frac{PF}{P-F}$$

$$d = \frac{P'H}{P+P'}$$

Substituting for $P'$, $$d = \left(\frac{PFH}{P-F}\right)\left(\frac{P-F}{P^2}\right) = \frac{FH}{P}$$

The distance $P = p' - s$. (Note: $p'$ is a minus quantity.)

I have discovered that by making $s$ equal to $f$, the focal length of $l$, that $d$ will remain constant. Referring to the foregoing equations and substituting $f$ for $s$:

$$P = p' - s = p' - f = \frac{pf}{p-f} - f = \frac{f^2}{p-f}$$

Substituting for $P$ $$d = \frac{FH}{P} = \left(\frac{Ffh}{p-f}\right)\left(\frac{p-f}{f^2}\right) = \frac{Fh}{f}$$

Since $F$, $h$ and $f$ are constants under all conditions known to me, $d$ is constant so long as $s = f$. To focus and at the same time register the spaced points, all that is necessary is relative motion between $mn$ and the combination $l$, $s$, $L$.

It might appear, from the foregoing that the point of register must lie on the axis AX. This however is not the case, the diagram shown having been selected for simplicity of explanation.

If the spacing between the two lenses remain at all times $$2d = \frac{2Fh}{f}$$

their position may be either symmetrical or asymmetrical with respect to AX and this is true of the spacing $2h$ between the object points.

As mentioned heretofore, structural requirements may preclude the possibility of axially moving either the object-plane $mn$ or the auxiliary lenses L. This means that $l$ alone must be moved with respect to $mn$ and without change of $s$. This I accomplish as shown at Fig. 4, where the axes of auxiliary lenses $L_1$ and $L_2$ are arranged perpendicular to the geometrical axis of the lens $l$, and a reflector R is carried by the lens $l$, in fixed relation thereto, and is arranged at a 45° angle with respect both to the geometrical axis of the lens $l$ and the axes of the auxiliary lenses $L_1$ and $L_2$. The arrangement of the reflector R and the lenses $L_1$ and $L_2$ is such that the distance $a$ on the optical axis A—X, between the lens L and the reflector R and the distance $b$ on the optical axis between the plane of the auxiliary lenses $L_1$ and $L_2$, together equals the distance $s$. As all necessary adjustments can be effected by the movement of the lens $l$, through a distance of less than one-half inch, the axial ray from the lens $l$ will always be reflected in position to be intercepted by the auxiliary lenses $L_1$ and $L_2$. Adjustment of the lens $l$ is along a line parallel to the plane of the auxiliary lenses $L_1$ and $L_2$ and, therefore, there will be no change in the distance $b$ upon such adjustment and as the reflector R is fixed relative to the lenses $l$, the distance $a$ remains constant. Therefore, the distance $s$ which is the sum of $a$ and $b$ remains fixed for different adjustments of the lens $l$.

A preferred form of the invention is shown at Figs. 5 and 6 where Fig. 6 is an elevation view and Fig. 5 a section taken along the line XX of Fig. 6.

Light from the source 1 is concentrated by condensers 2 on film 3 at gate 4. The rotating refractor 5 is so timed with the film-feeding sprocket 6 by means of gears 7 and 8 that two stationary virtual images per cycle are produced of the moving film. A masking shutter 9 operates close to the film plane and serves to prevent more than one picture of the picture-film from being shown at a time. The lens 10 is mounted in a support 11 as is also the 45° reflecting prism 12. This support is slidably mounted in the tracks 13 so that rotation of the knob 14 fastened to threaded shaft 15 which is fitted into a correspondingly threaded hole in support 16 supplies axial movement to the lens and prism combination through the connection 17. The segmental lenses 18 are mounted in frames 19 carried on shafts 20. The gear 21 fastened to refractor shaft 22 drives an idler 23 which drives gears 24 and 25 and supplies the synchronization between the rotation of the segmental lenses and the travel of the film. The mirror 26, adjustable by rotation of knob 27, is for use in directing the emerging light in the proper direction. The mechanism is driven by a motor 29 through the spiral gear 28. The masking shutter is driven by means of spiral gears 30 and 31.

While certain specific forms have been described and shown, it is obvious that many modifications are possible. Thus, by suitable changes in speed and thickness of the plate shown at Fig. 1, any number of stationary virtual images may be formed. This in turn would call for additional auxiliary lenses mounted either on separate shafts or on the same shafts. The number of compensation cycles and consequently the number of stationary virtual images formed and the number of auxiliary lenses required is at least two and may be greater and in the claims N is used to designate a predetermined whole number greater than one and each time that N appears in a claim it represents the same number. If on the same shafts, combined lenses could be used, one member of the combination being on one shaft and the other on the other.

The focal length of the auxiliary lenses may have any value consistent with requirements of the design and may even be negative lenses. In the case of negative lenses, the spacing becomes a minus quantity in which case the positions of $L_1$ and $L_2$ would be interchanged.

It is of course understood that various changes may be made in the device above described without in any way departing from the spirit of the invention as defined in the appended claims.

I claim:

1. In an optical system for establishing optical conjugacy between N spaced points lying in a plane and a single point lying in a second plane, a lens combination optically intermediate said planes and comprising a main lens, N equipowered auxiliary lenses lying in the first principal focal plane of the main lens and being spaced apart by a distance equal to the distance between said spaced points times the focal length of an auxiliary lens divided by the focal length of the main lens, each lens being individual to one of said spaced points and individually cooperative with the main lens to render such point optically conjugate with said single point, and means for rendering each auxiliary lens singly cooperative with the main lens.

2. In an optical system for establishing optical conjugacy between N spaced points lying in a plane and a single point lying in a second plane, a lens combination optically intermediate said planes and comprising a main lens, N equipowered auxiliary lenses having their optical axes perpendicular to that of the main lens, a 90° deflector fixed to the main lens to direct light between the main and auxiliary lenses, means for producing relative axial movement between the main lens and the plane of said spaced points, said auxiliary lenses lying optically in substantially the first principal focal plane of the main lens and being spaced apart by a distance equal to the distance between said spaced points times the focal length of an auxiliary lens divided by the focal length of the main lens, each auxiliary lens being individual to one of said spaced points and individually cooperative with the main lens to render such point optically conjugate with said single point, and means for rendering each auxiliary lens singly cooperative with the main lens.

3. In an optical system for establishing optical conjugacy between N spaced points lying in a plane and a single point lying in a second plane, a lens combination optically intermediate said planes and comprising a main lens, N equipowered auxiliary lens segments each having coincident optical and rotational axes, each lens segment being individual to one of said spaced points and individually cooperative with said main lens to render such point optically conjugate with said single point, and means for rotating said lens segments individually into operative relation with the main lens.

4. In an optical system for establishing optical conjugacy between N spaced points lying in a plane and a single point lying in a second plane, a lens combination optically intermediate said planes and comprising a main lens, N equipowered rotatable lens segments each having coincidental optical and rotational axes, said lens segments lying in the first principal focal plane of the main lens and being spaced apart by distance equal to the distance between said spaced points times the focal length of a lens segment divided by the focal length of the main lens, each lens segment being individual to one of said spaced points and individually cooperative with the main lens to render such point optically conjugate with said single point, and means for rotating said lens segments individually into operative relation with the main lens.

5. In an optical system for establishing optical conjugacy between N spaced points lying in a plane and a single point lying in a second plane, a lens combination optically intermediate said planes and comprising a main lens, N equipowered rotatable lens segments each having coincidental rotation and optical axes perpendicular to the axis of the main lens, a 90° deflector fixed to the main lens to direct light between the main lens and the lens segments, means for producing relative axial movement between the main lens and the plane of said spaced points, said lens segments lying optically in substantially the first principal focal plane of the main lens and being spaced apart by a distance equal to the distance between said spaced points times the focal length of a lens segment divided by the focal length of the main lens, each lens segment being individual to one of said spaced points and individually cooperative with the main lens to render such point optically conjugate with said single point, and means for rotating said lens segments individually into operative relation with the main lens.

6. In a motion picture apparatus, means for feeding film at uniform linear speed, movable optical compensating means, timing means between the film feeding means and the compensating means to effect during movement of the film through a single picture cycle movement of the compensating means through N compensation cycles, whereby a point on the moving film is rendered optically conjugate successively with each of N spaced stationary points lying in a common plane, means for establishing optical conjugacy between said N spaced points and a single point in a second plane comprising a lens combination optically intermediate said two planes, said lens combination consisting of a main lens, N auxiliary lenses, each auxiliary lens being individual to one of said spaced points and individually cooperative with said main lens to render such point optically conjugate with said single point, and means synchronized with said compensating means for rendering each auxiliary lens singly cooperative with the main lens.

7. In a motion picture apparatus, means for feeding film at uniform linear speed, movable optical compensating means, timing means between the film feeding means and the compensating means to effect during movement of the film through a single picture cycle movement of the compensating means through N compensation cycles, whereby a point on the moving film is rendered optically conjugate successively with each of N spaced stationary points lying in a common plane, means for establishing optical conjugacy between said N spaced points and a single point in a second plane comprising a lens combination optically intermediate said two planes, said lens combination consisting of a main lens, N equi-powered auxiliary lenses lying in the first principal focal plane of the main lens and being spaced apart by a distance equal to the distance between said spaced points times the focal length of an auxiliary lens divided by the focal length of the main lens, each lens being individual to one of said spaced points and individually cooperative with the main lens to render such point optically conjugate with said single point, and means synchronized with said compensating means for rendering each auxiliary lens singly cooperative with the main lens.

8. In a motion picture apparatus, means for feeding film at uniform linear speed, movable optical compensating means, timing means between the film feeding means and the compensating means to effect during movement of the film through a single picture cycle movement of the compensating means through N compensation cycles, whereby a point on the moving film is rendered optically conjugate successively with each of N spaced stationary points lying in a common plane, means for establishing optical conjugacy between said N spaced points and a single point in a second plane comprising a lens combination optically intermediate said two planes, said lens combination consisting of a main lens, N equi-powered auxiliary lenses having their optical axes perpendicular to that of the main lens, a 90° deflector fixed to the main lens to direct light between the main and auxiliary lenses, means for producing relative axial movement between the main lens and the plane of said spaced points, said auxiliary lenses lying optically in substantially the first principal focal plane of the main lens and being spaced apart by a distance equal to the distance between said spaced points times the focal length of an auxiliary lens divided by the focal length of the main lens, each auxiliary lens being individual to one of said spaced points and individually cooperative with the main lens to render such point optically conjugate with said single point, and means synchronized with said compensating means for rendering each auxiliary lens singly cooperative with the main lens.

9. In a motion picture apparatus, means for feeding film at uniform linear speed, movable optical compensating means, timing means between the film feeding means and the compensating means to effect during movement of the film through a single picture cycle movement of the compensating means through N compensation cycles, whereby a point on the moving film is rendered optically conjugate successively with each of N spaced stationary points lying in a common plane, means for establishing optical conjugacy between said N spaced points and a single point in a second plane comprising a lens combination optically intermediate said two planes, said lens combination consisting of a main lens, N equi-powered auxiliary lens segments each having coincident optical and rotational axes, each lens segment being individual to one of said spaced points and individually cooperative with said main lens to render such point optically conjugate with said single point, and means synchronized with said compensating means for rotating said lens segments individually into operative relation with the main lens.

10. In a motion picture apparatus, means for feeding film at uniform linear speed, movable optical compensating means, timing means between the film feeding means and the compensating means to effect during movement of the film through a single picture cycle movement of the compensating means through N compensating cycles, whereby a point on the moving film is rendered optically conjugate successively with each of N spaced stationary points lying in a common plane, means for establishing optical conjugacy between said N spaced points and a single point in a second plane comprising a lens combination optically intermediate said two planes, said lens combination consisting of a main lens, N equi-powered rotatable lens segments each having coincidental optical and rotational axes, said lens segments lying in the first principal focal plane of the main lens and being spaced apart by a distance equal to the distance between said spaced points times the focal length of a lens segment divided by the focal length of the main lens, each lens segment being individual to one of said spaced points and individually cooperative with the main lens to render such point optically conjugate with said single point, and means synchronized with said compensating means for rotating said lens segments individually into operative relation with the main lens.

11. In a motion picture apparatus, means for feeding film at uniform linear speed, movable optical compensating means, timing means between the film feeding means and the compensating means to effect during movement of the film through a single picture cycle movement of the compensating means through N compensation cycles, whereby a point on the moving film is rendered optically conjugate successively with each of N spaced stationary points lying in a common plane, means for establishing optical conjugacy between said N spaced points and a single point in a second plane comprising a lens combination optically intermediate said two planes, said lens combination consisting of a main lens, N equi-powered rotatable lens segments each having coincidental rotational and optical axes perpendicular to the axis of the main lens, a 90° deflector fixed to the main lens to direct light between the main lens and the lens segments, means for producing relative axial movement between the main lens and the plane of said spaced points, said lens segments lying optically in substantially the first principal focal plane of the main lens and being spaced apart by a distance equal to the distance between said spaced points times the focal length of a lens segment divided by the focal length of the main lens, each lens segment being individual to one of said spaced points and individually cooperative with the main lens to render such point optically conjugate with said single point, and means synchronized with said compensating means for rotating said lens segments individually into operative relation with the main lens.

JACOB FRANK LEVENTHAL.